United States Patent
Tomky et al.

(10) Patent No.: US 11,994,253 B2
(45) Date of Patent: May 28, 2024

(54) INCORPORATING CAM INTO RAIL OF ROTATIONAL MOUNT

(71) Applicant: Microsoft Technology Licensing, LLC, Redmond, WA (US)

(72) Inventors: Brett Andrew Tomky, Seattle, WA (US); Christina Ashley Yee, Redmond, WA (US); Daniel Clark Park, Woodinville, WA (US); Nicholas Benjamin Wendt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/640,286

(22) PCT Filed: Sep. 2, 2020

(86) PCT No.: PCT/US2020/049003
§ 371 (c)(1),
(2) Date: Mar. 3, 2022

(87) PCT Pub. No.: WO2021/046090
PCT Pub. Date: Mar. 11, 2021

(65) Prior Publication Data
US 2022/0325847 A1 Oct. 13, 2022

(30) Foreign Application Priority Data
Sep. 4, 2019 (NL) ...................................... 2023764

(51) Int. Cl.
*F16M 11/10* (2006.01)
(52) U.S. Cl.
CPC ..... *F16M 11/105* (2013.01); *F16M 2200/041* (2013.01)

(58) Field of Classification Search
CPC ........... F16M 11/105; F16M 2200/041; F16M 11/10; F16M 2200/024; F16M 11/2021
(Continued)

(56) References Cited

U.S. PATENT DOCUMENTS

| 3,438,083 | A | * | 4/1969 | Kirk | ................... | E05D 11/1071 16/291 |
| 3,969,766 | A | | 7/1976 | Tanaka et al. | | |

(Continued)

FOREIGN PATENT DOCUMENTS

| CN | 102767678 A | 11/2012 |
| CN | 103068279 A | 4/2013 |

(Continued)

OTHER PUBLICATIONS

"Mount-It! Universal Single Monitor Desk Mount—MI-2751", Retrieved From: https://web.archive.org/web/20220530190814/ https://mount-it.com/collections/monitor-mounts/products/mount-it-universal-single-monitor-desk-mount-mi-2751, May 30, 2022, 9 Pages.

(Continued)

*Primary Examiner* — Christopher Garft
(74) *Attorney, Agent, or Firm* — Alleman Hall & Tuttle LLP (57) ABSTRACT

Examples are disclosed that relate to the rotational mounting of a display device to another supporting structure, such as a stand or a wall. One example provides a system comprising a display device, a support structure configured to be mounted to another structure to thereby support the display device on the other structure, and a mechanical interface rotationally connecting the display device and the support structure. The mechanical interface comprises three or more rail segments including a cam rail segment comprising a cam, and for each rail segment, one or more corresponding (Continued)

rollers, a roller for the cam rail segment being a follower and being coupled with a spring configured to bias the follower toward the cam rail segment.

20 Claims, 9 Drawing Sheets (58) Field of Classification Search
USPC ........................................................ 248/122.1
See application file for complete search history.

(56) References Cited

U.S. PATENT DOCUMENTS

| | | | |
|---|---|---|---|
| 4,726,253 | A | 2/1988 | Russell |
| 4,948,083 | A | 8/1990 | Mcnaney et al. |
| 5,791,621 | A * | 8/1998 | Yashima ............... A47B 81/065 |
| | | | 348/827 |
| 6,517,040 | B1 * | 2/2003 | Wen ................... F16M 11/2064 |
| | | | 248/920 |
| 7,869,840 | B2 | 1/2011 | Kim et al. |
| 7,969,714 | B2 | 6/2011 | Wang |
| 2007/0010301 | A1 | 1/2007 | Kim |
| 2008/0055832 | A1 * | 3/2008 | Ozolins ................. F16M 11/14 |
| | | | 361/679.04 |
| 2009/0242722 | A1 | 10/2009 | Lee et al. |
| 2013/0181099 | A1 * | 7/2013 | Hsu ....................... A47B 23/043 |
| | | | 248/122.1 |
| 2013/0181903 | A1 * | 7/2013 | Hsu ........................ G06F 1/1662 |
| | | | 248/122.1 |
| 2014/0014790 | A1 | 1/2014 | White et al. |

FOREIGN PATENT DOCUMENTS

| | | |
|---|---|---|
| CN | 108319330 A | 7/2018 |
| CN | 109668011 A | 4/2019 |
| JP | 2004233922 A | 8/2004 |
| JP | 2017222162 A | 12/2017 |
| WO | 2008022264 A2 | 2/2008 |
| WO | 2015114385 A1 | 8/2015 |

OTHER PUBLICATIONS

"Operating the monitor", Retrieved From: https://web.archive.org/web/20150131223041/https:/www.inf.u-szeged.hu/sites/default/files/ipcglab/docs/hardware/Dell_U2410/UsersGuide/UG/operate.htm, Jan. 31, 2015, 14 Pages.
"Search Report Issued in Netherlands Patent Application No. N2023764", dated May 7, 2020, 8 Pages.
"International Search Report and Written Opinion Issued in PCT Application No. PCT/US20/049003", dated Dec. 7, 2020, 10 Pages.
"International Search Report and Written Opinion Issued in PCT Application No. PCT/US20/049003", dated Jan. 27, 2021, 11 Pages.
"Office Action and Search Report Issued in Chinese Patent Application No. 202080062633.9", dated Aug. 19, 2023, 13 Pages.

* cited by examiner

INCORPORATING CAM INTO RAIL OF ROTATIONAL MOUNT

CROSS REFERENCE TO RELATED APPLICATIONS

The present application is a U.S. National Phase of International Patent Application Serial No. PCT/US2020/049003 entitled "INCORPORATING CAM INTO RAIL OF ROTATIONAL MOUNT", filed Sep. 2, 2020, which claims priority to Netherlands Patent Application Serial No. 2023764, filed Sep. 4, 2019, the entire contents of each of which are hereby incorporated by reference for all purposes.

BACKGROUND

Many display devices are configured to be mounted to walls or stands for viewing. For example, a computer monitor may be mounted to a stand that is designed for a desktop environment. Likewise, a large format display may be mounted to a wall or floor stand for presenting content to an audience. Some mounting systems for display devices may be configured to allow a display device to be rotated between different orientations, such as a between a landscape orientation in which a long dimension of the display is horizontally oriented, and a portrait orientation in which the long dimension of the display is vertically oriented.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to a rotationally adjustable mounting system for mounting a display device to another supporting structure, such as a stand or a wall. One example provides a display system comprising a display device, a support structure configured to be mounted to another structure to thereby support the display device on the other structure, and a mechanical interface rotationally connecting the display device and the support structure. The mechanical interface comprises three or more rail segments including a cam rail segment comprising a cam, and for each rail segment, one or more corresponding rollers, a roller for the cam rail segment being a follower and being coupled with a spring configured to bias the follower toward the cam rail segment.

DETAILED DESCRIPTION

As mentioned above, some mounting systems for display devices allow a display device to be rotated between different orientations, such as a between a landscape orientation and a portrait orientation. In this manner, a user may rotate a display device to an orientation best suited for content currently being displayed.

Some rotational mounting systems include a rail and roller system to enable rotational adjustment. Rail and roller systems allow motion in a plane around a central pivot location while constraining movement out of the plane of rotation. Such systems may include three or more curved rail segments, and one or more corresponding rollers for each rail segment. The rail segments may be formed from separate rail structures, or may comprise different portions of a same rail structure. As a display device is rotationally adjusted, each roller moves along the corresponding rail segment. Such a rail and roller mounting system also may include a separate cam system that biases the display device toward predetermined orientations, thereby helping to hold the display device in the predetermined orientations, and allowing the display device to automatically home in on the predetermined orientations via the spring force and cam profile. This may provide a user experience in which the display device seems to automatically complete a rotational adjustment by snapping to a destination orientation.

The accuracy of the fit of the rails and rollers impacts the characteristics of the mechanical interface between the display device and the supporting structure. For example, if the rollers do not fit tightly enough to the rail segments, then a user may feel some looseness between the rollers and rail segments while moving the display device, which may impact a user experience. Likewise, if the rollers fit too tightly to the rail segments, the display device may be relatively difficult for users to rotate.

However, achieving a proper roller/rail fit may pose challenges during manufacturing. For example, where the rail segments and rollers are mounted at fixed locations on the mounting system during manufacturing, a complex adjustment procedure may be used to position these parts prior to mounting. Such an adjustment procedure may involve, for example, making iterative adjustments to tighten rail segment and roller contact at end portions of each rail segment. More specifically, as the rail segments are rigid bodies, the position of one end of each rail segment may be adjusted for the portrait orientation, and the other end of each rail segment may be adjusted for the landscape orientation. However, this may not allow for adjustments to the middle portion of the rail segment. Thus, to prevent binding in the middle portion of the rail segments, the shape of the rail segments may be designed such that a fit between the rail segments and the rollers intentionally errs on the side of a looser fit. However, due to manufacturing tolerances, this may result in imperfect contact of the roller with the middle portion of the rail segment, which may lead to perceptible looseness in the middle portion of a rotational movement range. Further, a spring device may be used to preload the rail segment and roller interfaces to achieve a more accurate fit during manufacturing. However, such a preloading process has variability, and may limit manufacturing yields due to a length of time the process takes.

Accordingly, examples are disclosed that relate to a rotational mounting system that may help to address such problems. As described in more detail below, the disclosed examples combine a rail and roller system with a cam and follower system in a manner that may allow complex adjustment processes to be avoided during manufacturing. By configuring one or more of the rail segments as a cam and one or more corresponding rollers as a spring-biased follower, the spring force provided by the follower may act to pre-load the rollers against the rail segments during manufacturing, thereby avoiding the use of a separate spring mechanism during manufacturing. The spring-biased follower roller also may hold the rollers sufficiently tight against the rail segments during use to avoid the feel of looseness when a display device is rotated, allowing the spring-biased follower to absorb any variations in geometry due to manufacturing tolerances. Further, integrating the rail and roller system with the cam system may help to reduce manufacturing part count, overall cost, and defect rates.

Figure 1A:
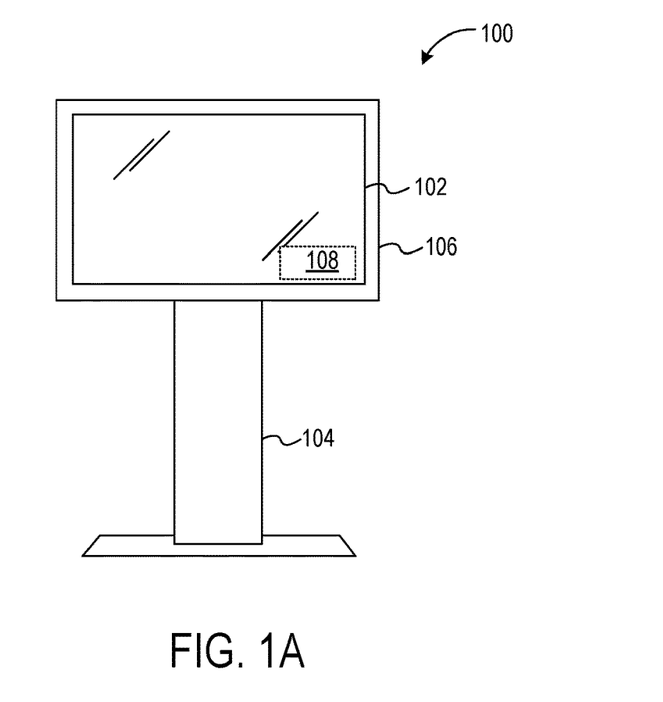
FIGS. 1A-1C show an example display device positioned in different orientations.

FIG. 1 shows a front view of an example display system 100 including a display device 102 and a stand 104, where the display device 102 is rotatable relative to the stand 104. The display device 102 is in communication with a computing device, illustrated schematically at 108, that provides visual information to the display device 102, which the display device 102 in turn presents for viewing. In some examples, the display device 102 and computing device 108 may comprise an all-in-one computing system in which components of the computing device 108 are contained in a same housing 106 with the display device 102. In other examples, the display device 102 may be housed separately from the computing device 108 and connected to the display device 102 via a wired or wireless connection.

In some examples, the display device 102 may be a touch-sensing display device that allows users to directly interact with the display device 102 and/or visual information presented on the display device 102. The display device 102 may comprise a light-emitting diode (LED) display, an organic light-emitting device (OLED) display, a liquid crystal display (LCD), a quantum-dot (QD) display or any other suitable type of display.

Figure 1B:
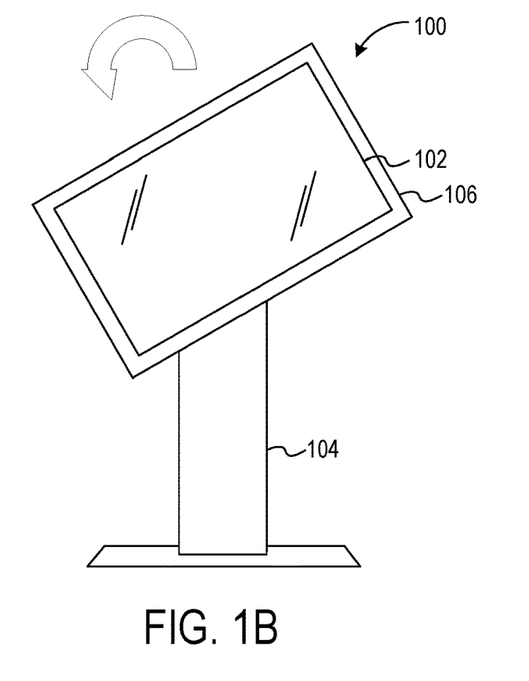
Figure 1C:
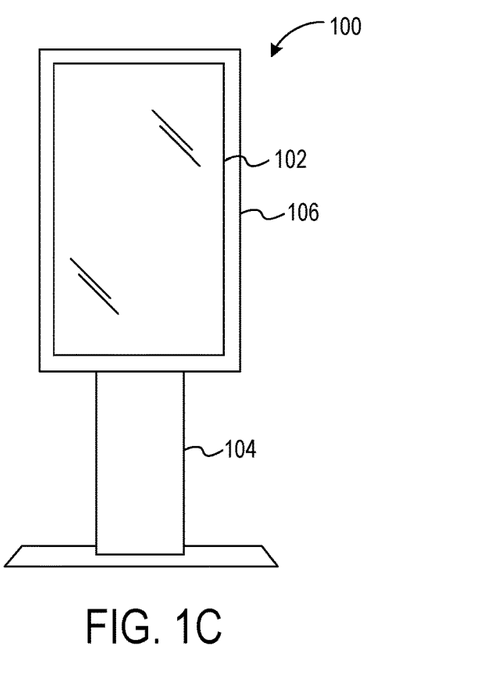

FIGS. 1A-1C illustrate an example rotation of the display device 102 from a first position to a second position. In this example, the display device 102 is rotated from a horizontal (landscape) orientation, as shown in FIG. 1A, to a vertical (portrait) orientation, as shown in FIG. 1C. In other examples, a display 102 may be configured to rotate between any other suitable orientations. The display 102 may be rotated relative to the stand 104 by application of a manual force, or by a power-assisted mechanism.

Although FIGS. 1A-C illustrate a 90° rotation of the display device 102 between landscape and portrait orientations, a rotational mounting system according to the present disclosure may be configured to rotate through any suitable angular range. Further, a pivot point of the rotation may translate some distance, or may remain in a same location, throughout rotation. In some examples, a rotational mounting system may be configured to rotate in a plane other than, or in addition to, a plane of a display screen. For example, a writing/drawing tablet computing device may be rotatable an upright orientation to a flat orientation that is generally parallel to a supporting surface, such as a table or floor.

Figure 2:
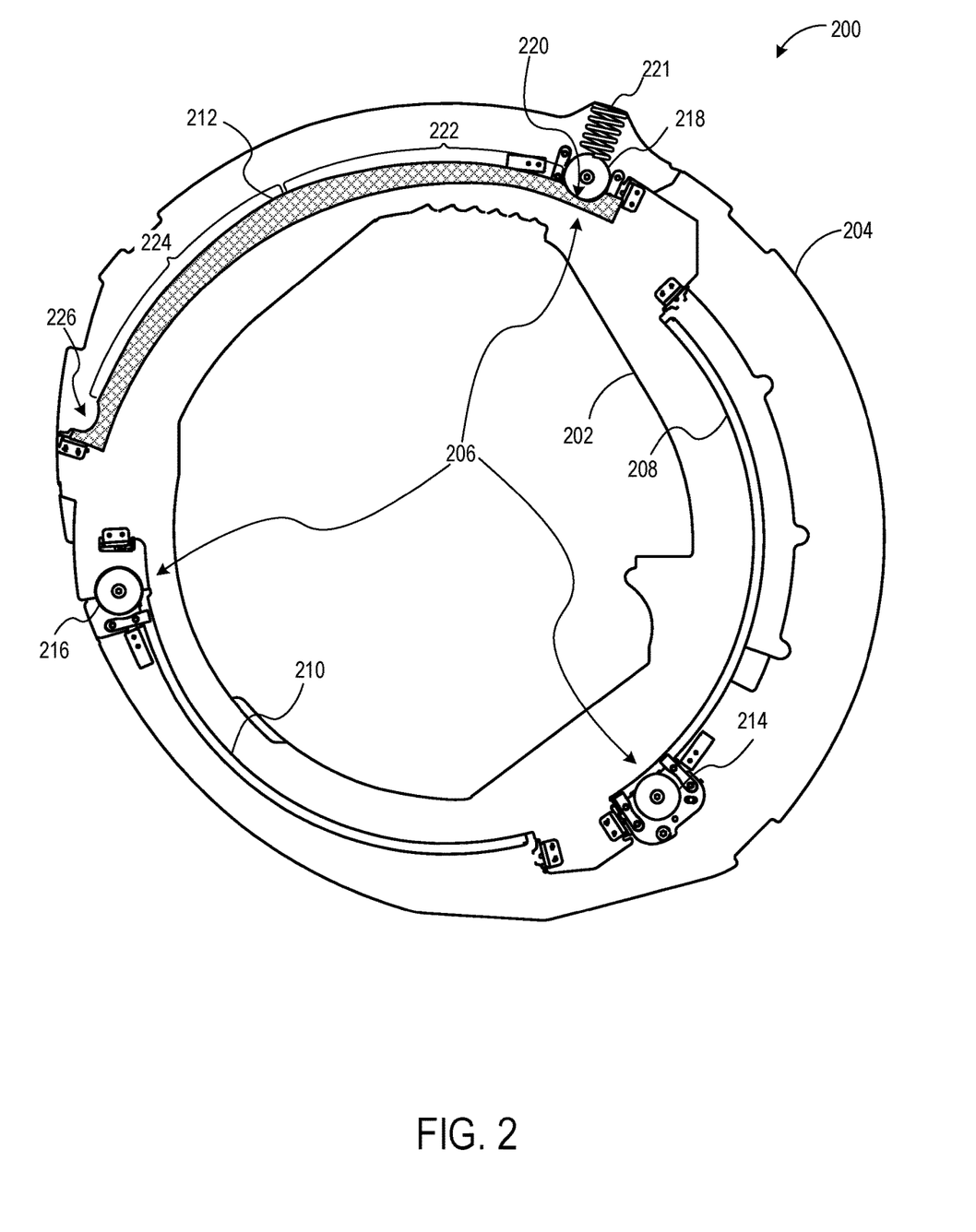
FIG. 2 shows an example rotational mounting system having a rail segment configured as a cam, and illustrates the example rotational mounting system in a first orientation.

FIG. 2 shows a rotational mounting system 200 that includes a display mount 202 configured to be attached to a display device, and a support structure 204 configured to be mounted to another structure, such as a floor stand, desk stand, or wall mount. In other examples, the display mount 202 may be integrated with a display device.

The rotational mounting system 200 includes a mechanical interface 206 rotationally connecting the display mount 202 and the support structure 204. The mechanical interface 206 includes rail segments 208, 210, and 212. Rail segment 212 takes the form of a cam, and may be referred to herein as the cam rail segment 212. The mechanical interface 206 further comprises, for each rail segment, a corresponding roller. In the depicted example, rollers 214 and 216 correspond respectively to rail segments 208 and 210. Roller 218 corresponds to the cam rail segment 212, and acts as a follower. Thus, roller 218 is also referred to herein as follower 218. In the depicted example, the rail segments 208, 210 and cam rail segment 212 are arranged on the display mount 202, while the rollers 214, 216, and the follower 218 are arranged on the support structure 204. In other examples, the rail segments (including the cam rail segment 212) may be located on the support structure 204, while the rollers (including the follower 218) may be located on the display mount 202. In yet other examples, each side of the mechanical interface may include a subset of both rail segments and rollers. While the depicted example shows one roller per rail segment, in other examples, more than one roller may be used for each of one or more rail segments.

FIG. 2 illustrates the rotational mounting system 200 in a first position. The first position may correspond, for example, to a portrait orientation of a display device mounted to the rotational mounting system 200. In this position, the follower 218 sits in a first detent 220 of the cam rail segment 212. The mechanical interface 206 further comprises a spring 221 coupled to the follower 218 that biases the follower 218 toward the cam rail segment 212. The spring 221 may comprise any suitable type of spring, including a mechanical spring (e.g. a coil spring or leaf spring) or an elastomeric spring.

A user may initiate rotation of the display device by applying a rotational force to the display device. Upon application of such a force, the follower 218 moves out of the first detent 220 and along the cam rail segment 212. The spring 221 is compressed as the follower 218 moves out of the first detent 220, and thereby provides a sensation of resistance as the follower 218 moves out of the first detent 220. The spring force likewise helps to maintain contact between the rollers and corresponding rail segments, thereby avoiding any sensation of looseness that may be experienced with fixed-position rollers due to manufacturing variability.

Figure 3:
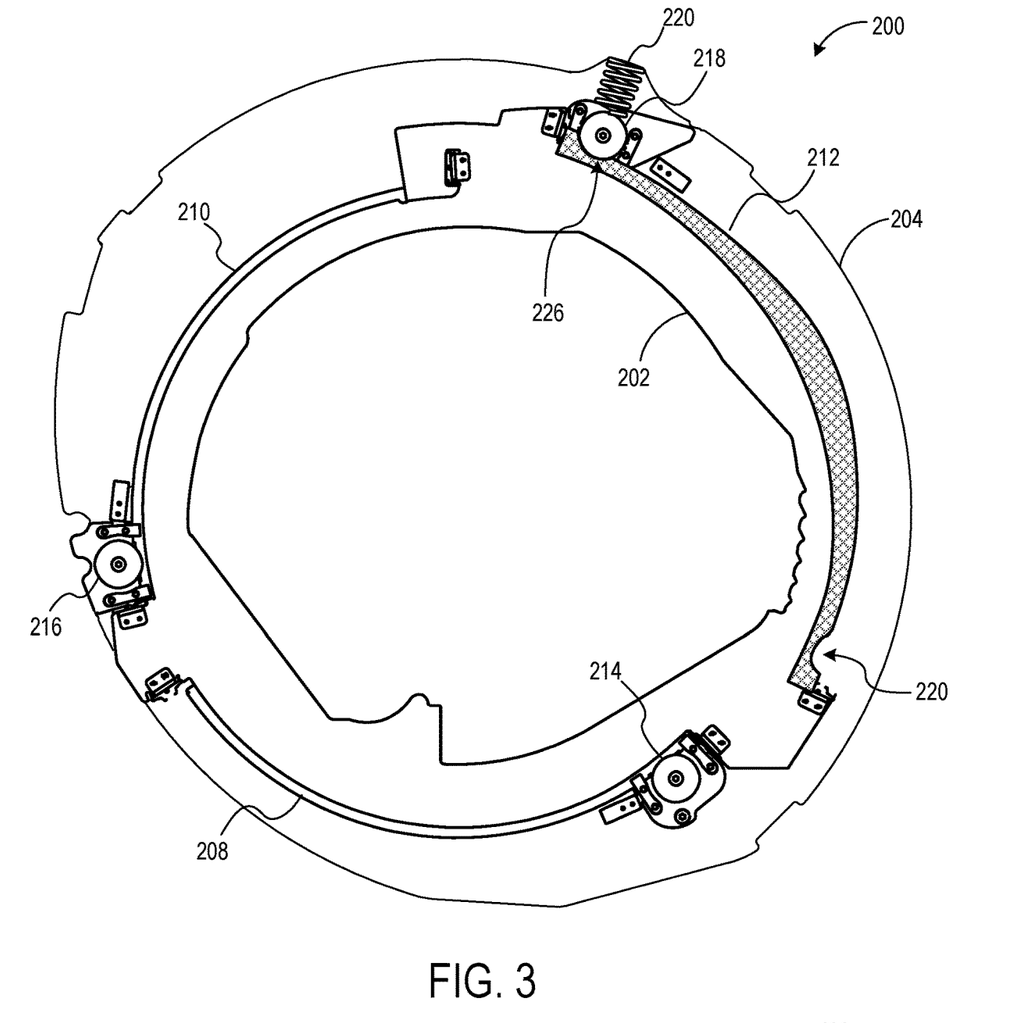
FIG. 3 shows the rotational mounting system of FIG. 2 in a second orientation.

In some examples, the cam may comprise a profile configured to bias the rotational mounting system 200 toward the first detent 220 or a second detent 226, depending upon the location of the follower 218 along the cam rail segment 212. The cam rail segment 212 of FIG. 2 has such a profile that some resistance to rotational movement is initially felt as the follower 218 moves along a first portion 222 of the cam rail segment 212 after leaving the first detent 220. Upon reaching the apex of the cam rail segment 212, force provided by the spring 221 then assists movement of the follower 218 along a second portion 224 of the cam rail segment 212 and into a second detent 226. This may provide a sensation of the display initially resisting movement toward, then being biased toward, and then snapping to, a rotational orientation corresponding to the destination orientation. FIG. 3 shows the rotational mounting system 200 oriented in a second orientation, which may correspond to a landscape orientation of a display device. A cam rail segment may be designed with any suitable profile to achieve desired force characteristics along a rotational adjustment path. A torque curve for an example cam profile is described in more detail below.

While the rotational mounting system of FIGS. 2 and 3 comprises three rail segments and three corresponding rollers, other examples may comprise any other suitable number of rail segments, and the rail segments may have any other suitable configuration to provide a desired rotational range. Further, any suitable number of rollers may be used, and as mentioned above, more than one roller per rail segment may be used in some examples. As three points define a plane, the use of three or more rollers may help to constrain movement of a display device to rotation in a plane. Further, in some examples, more than one rail segment may be a cam rail segment, and/or more than one roller may act as a follower.

Figure 4:
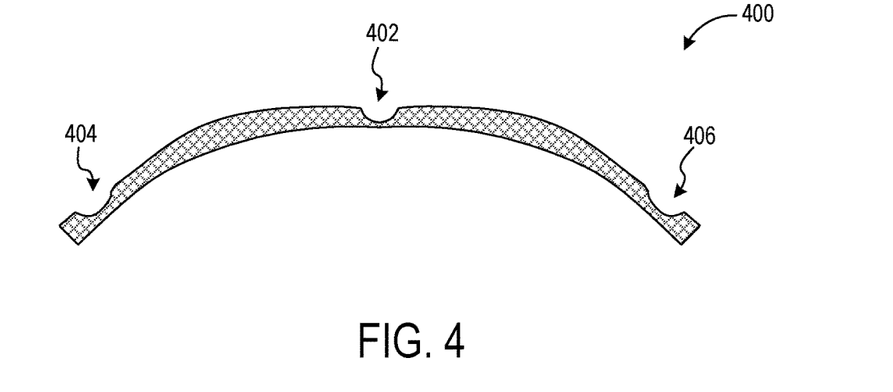
FIG. 4 shows an example cam rail segment comprising a detent in a middle portion of the rail segment.

In the example of FIGS. 2 and 3, the first detent 220 and the second detent 226 are located at opposite end portions of the cam rail segment 212, and define the endpoints of a range of rotational motion. In other examples, detents may be located in any other suitable positions along a cam rail segment 2. FIG. 4 shows another example cam rail segment 400 comprising a detent 402 located at a mid-portion of the cam rail segment 400, as well as detents 404, 406 located adjacent to each end of the cam rail segment. Such a cam rail segment may be used to hold a display at a midpoint of a rotational range of motion, in addition to holding the display at either endpoint.

Figure 5:
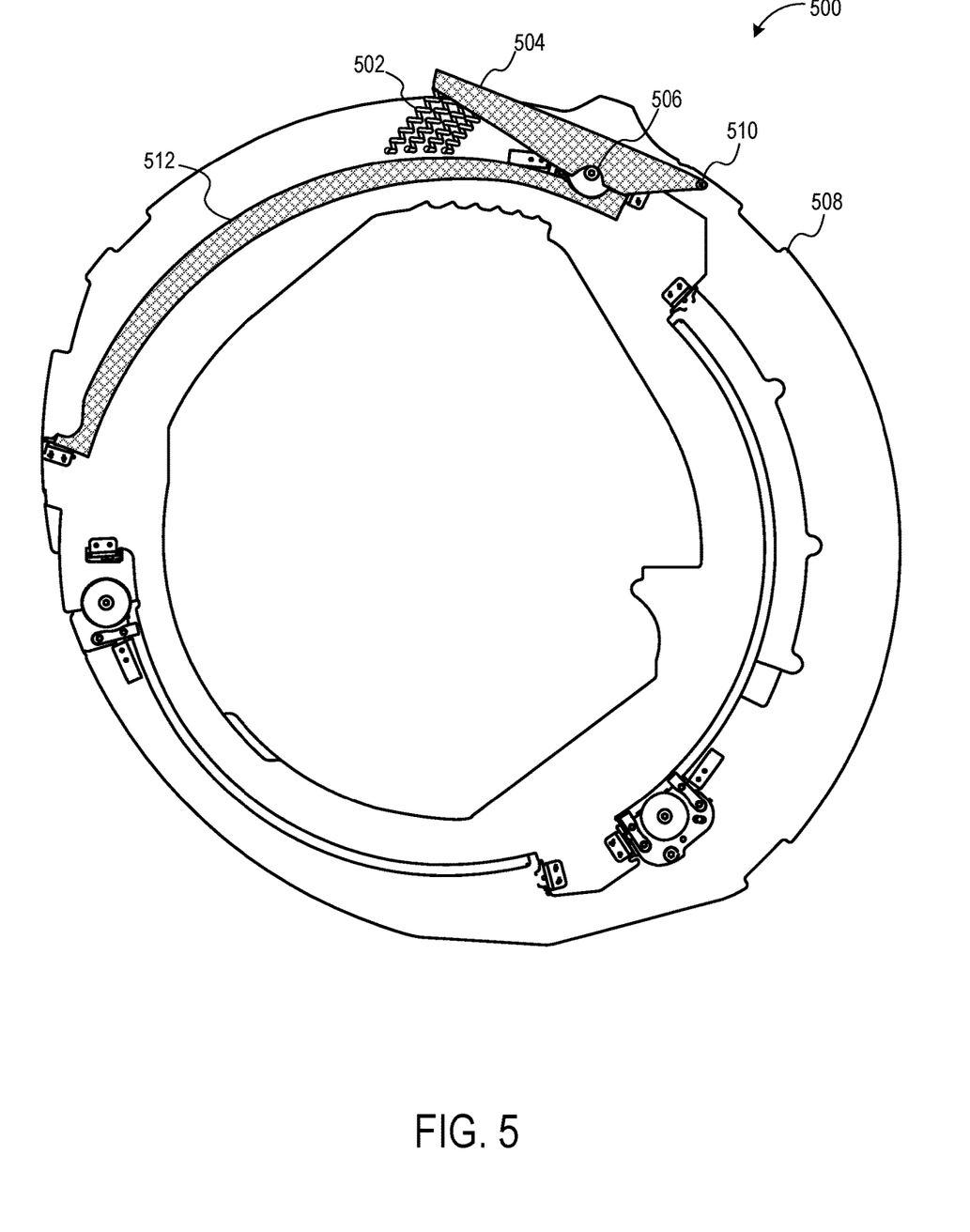
FIG. 5 shows another example rotational mounting system with another example follower configuration.

FIG. 5 shows illustrates another example follower 500 for a rotational mounting system. In the example of FIGS. 2 and 3, the spring is connected to the follower 500 directly opposite the cam rail. In contrast, in the example of FIG. 5, one or more springs (illustrated here as a plurality of springs 502) are connected to a lever 504 that is also connected to a roller follower 506. The lever 504 further is coupled to a frame 508 of the mounting system at a pivot 510. In this configuration, the lever may provide some mechanical advantage to the spring force applied to the follower 504 as the follower moves along the cam rail 512.

Figure 6A:
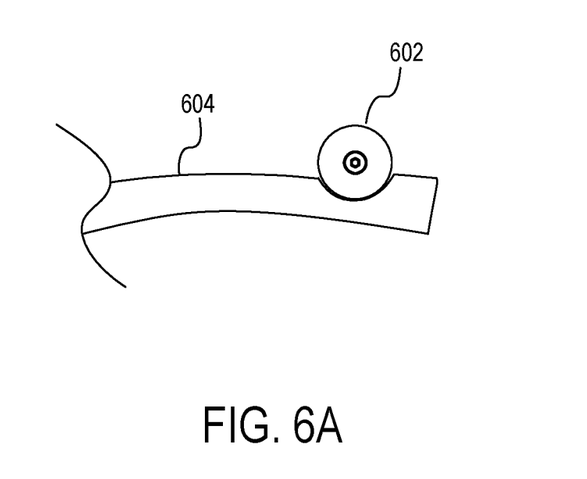
FIGS. 6A-6B show another example follower configuration.
Figure 6B:
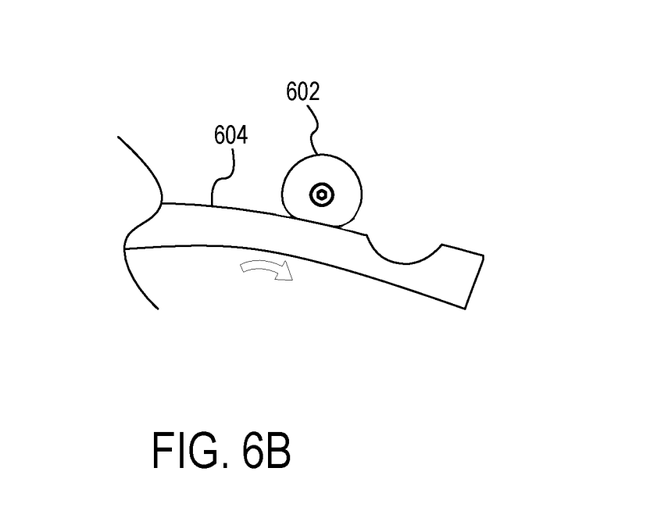

FIGS. 6A-6B shows another example follower 602. Instead of using a mechanical spring, the follower 602 comprises an elastomeric material that is integrated with a wheel of the follower 602, such that the elastomeric material acts as a spring when compressed. FIG. 6A shows the follower 602 in a detent of the cam rail segment 604, and FIG. 6B shows the follower 602 outside of the detent and compressed by the cam rail segment 604. Any suitable elastomeric material may be used, including natural and synthetic rubbers, silicone elastomers, urethane elastomers, etc. In some examples, the elastomeric material may form an outermost layer of a follower, such that the elastomer contacts the rail segment. In other examples, the elastomeric material may be positioned between an axis of rotation of the follower and the outermost surface of the follower, such that a circumferential shape of the follower is not distorted when the elastomeric material is compressed. In further examples, a follower may have a geometry configured to be flexible in the radial direction, such as a thin metal spoked wheel. The thin metal spokes may act as springs that can bend and provide some force/deflection. In yet other examples, a follower may be formed from a single piece of material with portions removed (or opening arranged) in locations to allow the wheel to flex radially, but be stiff in other directions. It will be understood that any suitable manner of providing a spring force on the cam may be used.

Figure 7:
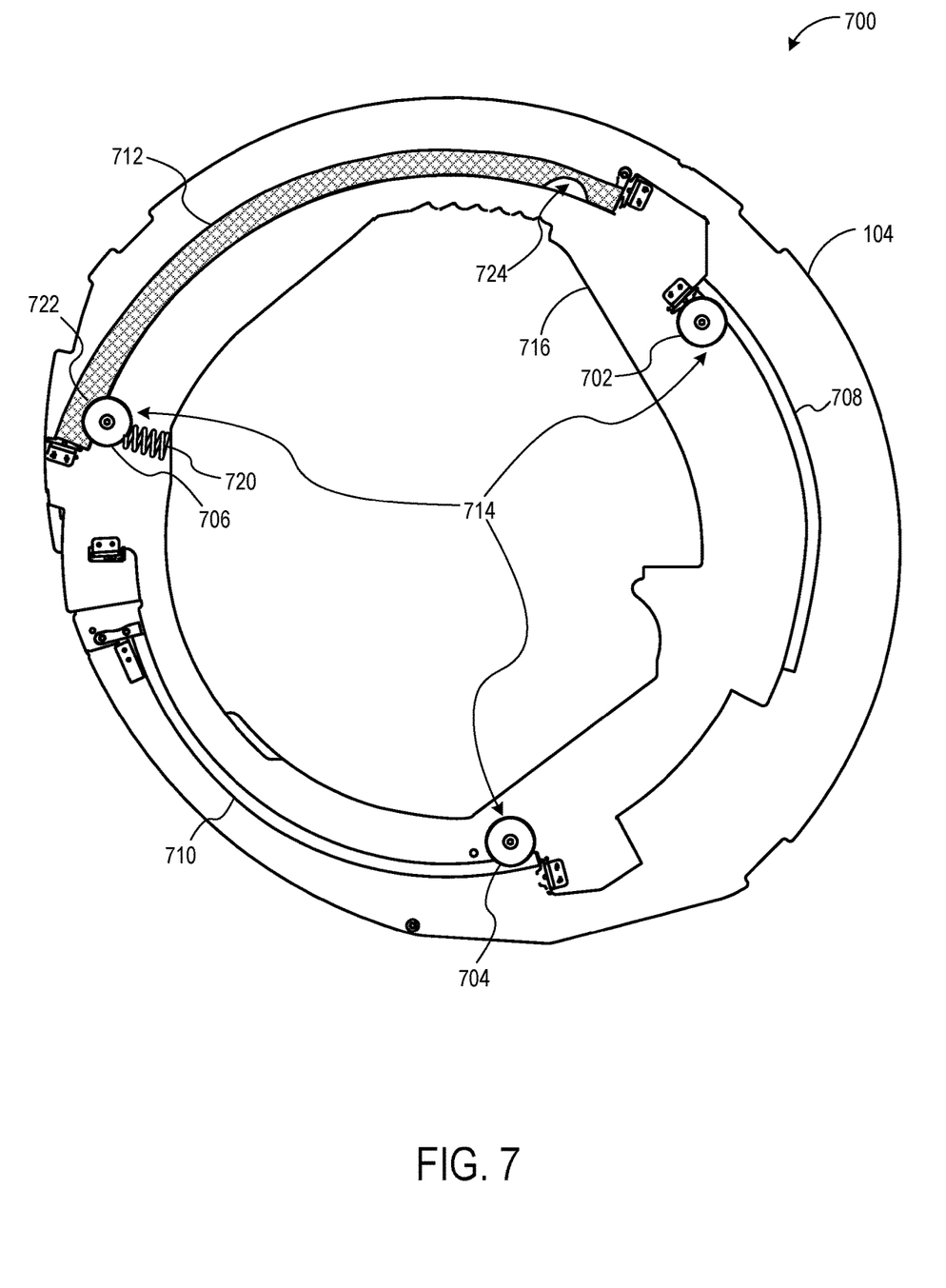
FIG. 7 shows an example rotational mounting system in which rollers are positioned interior to corresponding rail segments along a radial direction relative to an axis of rotation of the display.

FIG. 7 shows yet another example rotational mounting system 700. In the examples above, the rollers and followers are shown as being positioned exterior to the rail segments and cam rail segment along a radial direction relative to an axis of rotation of the mechanical interface. In contrast, FIG. 7 shows the rollers 702, 704 and follower 706 positioned interior to the rail segments 708, 710 and the cam rail segment 712 along a radial direction relative to an axis of rotation of the mechanical interface 714. Further, a spring 720 is positioned to an interior side of the follower 706 to bias the follower 706 against the cam rail segment 712. Example detents 722 and 724 are located on an interior, concave side of the cam rail segment 712. In other examples, one or more rollers may be positioned interior to the rail segments and one or more rollers may be positioned exterior to the rail segments along a radial direction relative to an axis of rotation of the mechanical interface.

Figure 8:
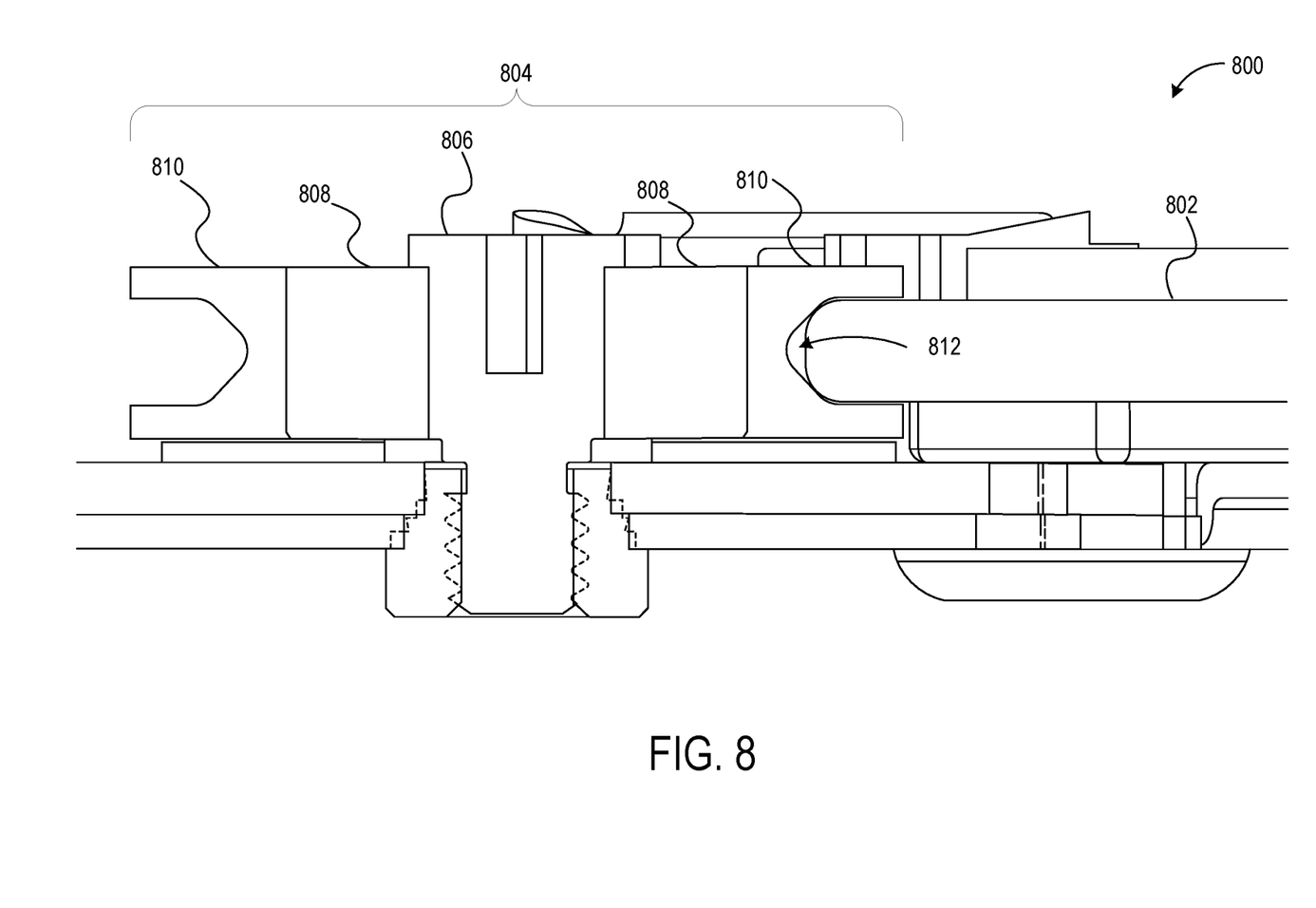
FIG. 8 shows a partial cross-sectional view of a rail segment and a roller of an example rotational mounting system.

FIG. 8 shows a partial cross-section of a rail segment 802 and a roller 804 of an example rotational mounting system 800. The roller 804 includes a roller shaft 806, a roller bearing 808, and a roller wheel 810 configured to contact the rail segment 802. As shown, the rail segment 802 extends into a slot 812 in the roller wheel with just a slight amount of space on either side of the rail segment 802, thereby providing an accurate fit to give a display device a solid, secure feel during rotational movement. The use of a spring and/or an elastomeric material as a follower (either for roller 804 where it acts as a follower, or for a different roller) may help to ensure that the rail 802 segment and roller portion 810 maintain contact throughout an entire range of rotational motion. Likewise, the use of a roller as a spring-biased follower also may help to pre-load the rollers and rails during manufacturing to ensure a suitably accurate fit, without the use of a separate spring-loading tool.

Figure 9:
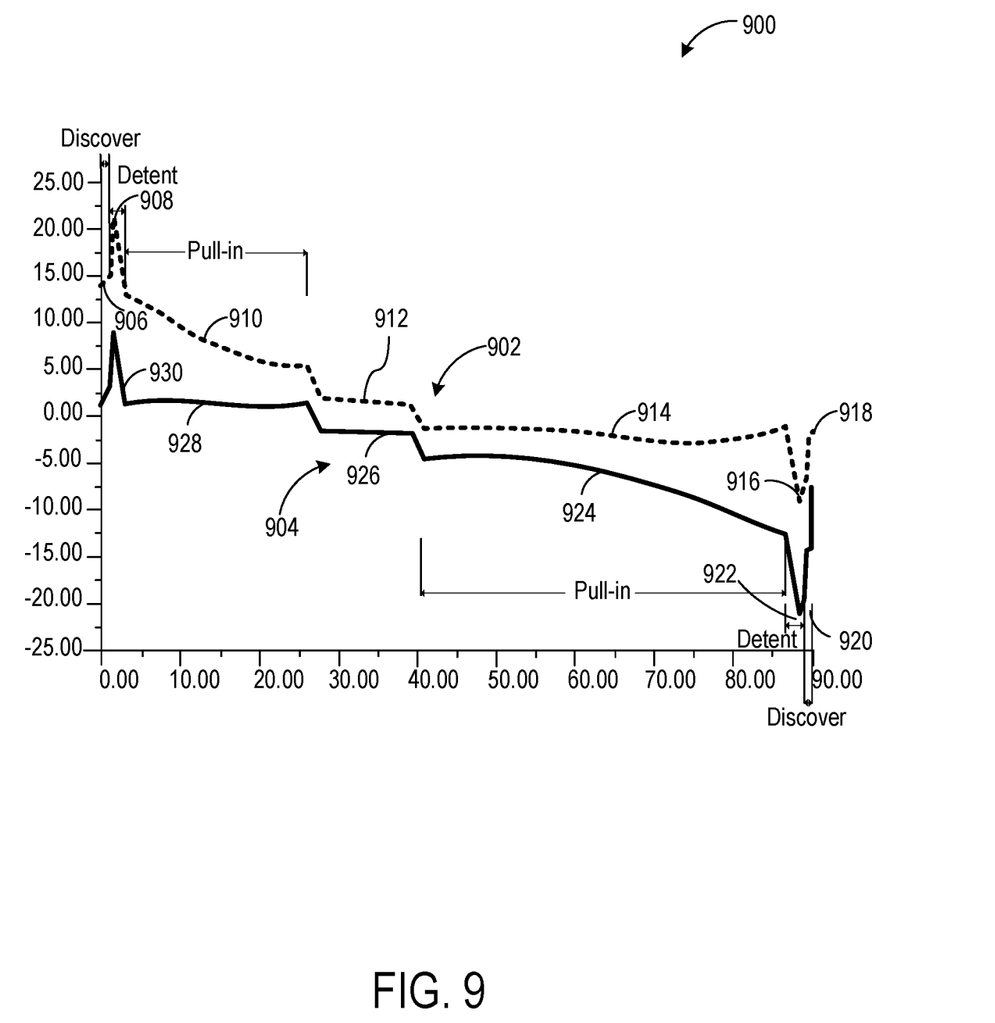
FIG. 9 shows a torque graph for an example rotational mounting system.

FIG. 9 shows an example torque graph 900, and illustrates torque curves 902 and 904 corresponding to rotational motion in each direction of a rotational adjustment range for a rotational mounting system. The torque curves 902 and 904 reflect examples of the resistance and/or assistance a user experiences while moving a display device between a first position and a second position of the rotational mounting system, in this example from 0° to 90°. Torque curve 902 (dotted line) represents rotation of the display device in a first rotational direction (e.g. from a portrait orientation to a landscape orientation), and torque curve 904 (solid line) represents rotation of the display device in an opposite rotational direction (e.g. from a landscape orientation to a portrait orientation). The torque curves have similar profiles, but exhibit hysteresis in magnitudes due, for example, to effects from dampening and/or other mechanisms (not shown) used in the example rotational mounting system corresponding to FIG. 9. In other examples, the torque curves may be approximately the same profiles and magnitudes moving from the first position to the second position and moving from the second position to the first position.

Torque curve 902 comprises a discovery stage 906 immediately adjacent the first position at 0° orientation. The rotational mounting system may generate relatively little torque in the discovery stage 124, such that a user may move the display device easily within the discovery stage 906 to "discover" the movable nature of the display device during interaction. The discovery stage 906 may abut a hard stop of the rotation, such that rotation is allowed with little resistance in a first rotation direction and prevents rotation back in the opposing second rotational direction. In various examples, the discovery stage 906 may have an angular width of less than 5°, less than 3°, less than 2°, or less than 1° from the end of the rotational range of motion.

Following the discovery stage 906, an initiation stage 908 corresponds to movement of a follower out of a first detent in a cam rail segment. A user may experience relatively more torque when attempting to move the follower past the first detent. Further, if a user removes rotational force in this stage, the display device may automatically rotate back to the first position due to the spring force applied by the follower to the detent portion of the cam rail. Following the initiation stage 908, as the display device moves toward the second position, a resistance stage 910 may be provided in which a force required to move the display decreases gradually.

A balanced stage 912 of torque curve 902 may follow the resistance stage 910, and provide a range of locations along the rotational path in which the display system is somewhat balanced. For example, the display may remain stationary when a user force is removed from the display in the balanced stage 912. In some examples, the balanced stage 912 may be an unstable equilibrium point, such that the display system is bistable in either the first position or the second position.

The torque curve 902 further includes a pull-in stage 914. During the pull-in stage 914, spring force provided by the follower of the rotational mounting system may assist the rotation of the display toward the second position in a controlled manner. For example, the rotational mounting system may provide a torque in the direction of the second position such that a user feels a sensation of assistance when rotating the display device through this stage compared to earlier stages of rotation. The pull-in stage includes a homing stage 916, in which the spring force applied by the roller against the cam rail at the second detent causes the display to automatically complete rotation to the second position. After passing the homing stage, the torque applied by the cam rail and follower to the display drops, as indicated at 918, once the follower is within the second detent.

Similar to torque curve 902, torque curve 904 illustrates a discovery stage 920 immediately adjacent the second position at 90° orientation. As with discovery stage 906, discovery stage 920 allows a small amount of rotation with little resistance. Following the discovery stage 920, torque curve 904 comprises an initiation stage 922 corresponding to movement of the follower out of the second detent in the cam rail segment. As with initiation stage 908, a user may experience relatively more torque when attempting to move the follower past the second detent compared to later movements along the rotational path. Further, if the user stops applying rotational force at this stage, the display device may rotate automatically back to the second position.

Following the initiation stage 922, as the display device moves toward the second position, a resistance stage 924 may be provided in which a force required to move the display decreases gradually. Next, torque curve 904 comprises a balanced stage 926 that may provide a range of locations along the rotational path in which the display system is somewhat balanced. Then, torque curve 904 comprises a pull-in stage 928 in which spring force provided by the follower in rotational mounting system again may assist the rotation of the display toward the first position in a controlled manner. The pull-in phase comprise a homing stage 930 in which spring force applied by the follower against the first detent in the cam rail automatically rotates the display device to the first position. In this example, the pull-in stage for torque curve 904 is shorter than the pull-in stage for torque curve 902 due to the particular configuration of the display system and cam profile, though in other examples the pull-in phases for each direction of movement may be similar in rotational extent.

Figure 10:
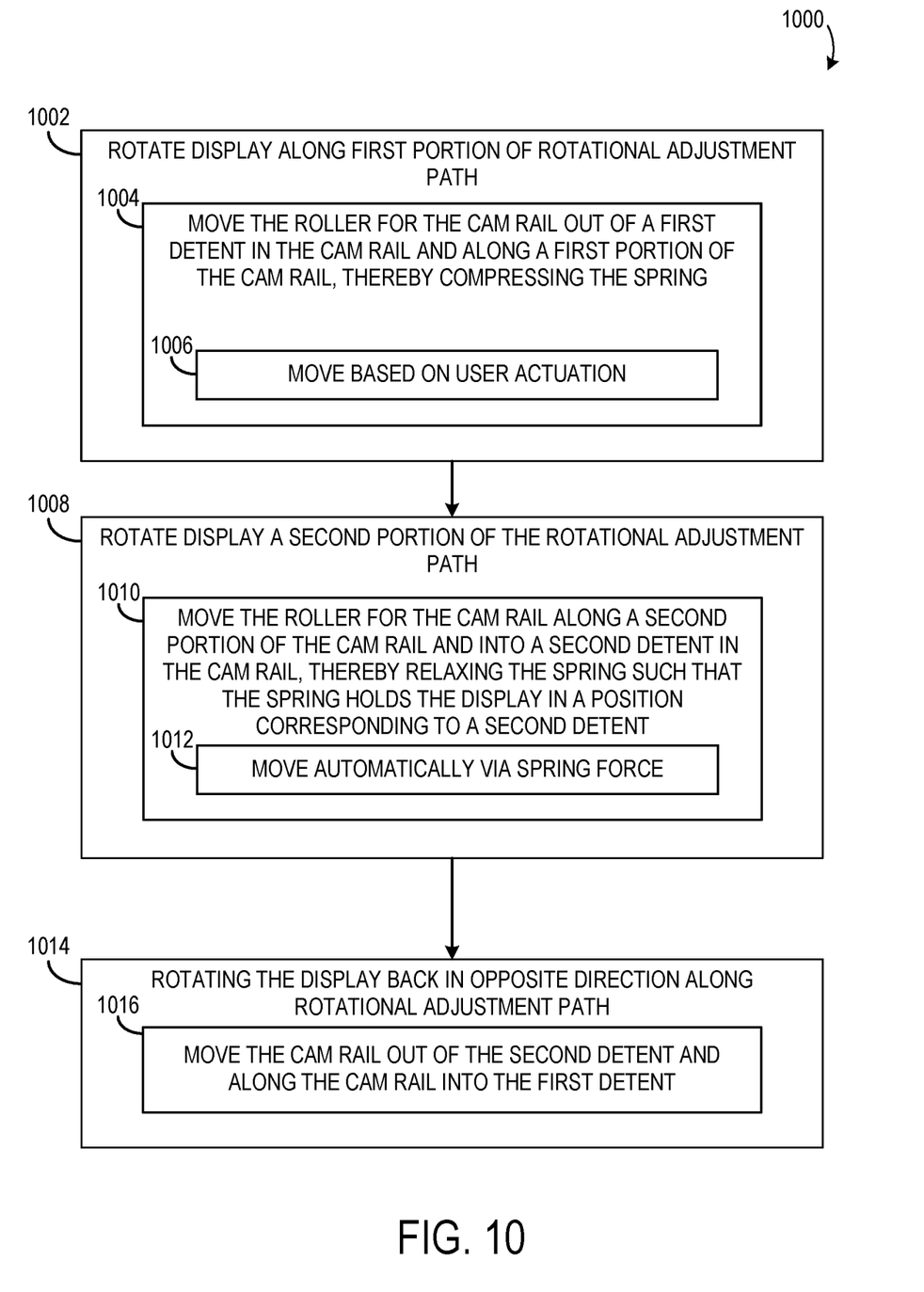
FIG. 10 shows a flow diagram illustrating an example method of operating a rotationally mounted display system.

FIG. 10 shows an example method 1000 of changing an orientation of a display system that is supported by a rotational mounting system, such as the examples described above. The method 1000 may be performed during manufacturing of a display system to help obtain and ensure a suitably accurate fit of rollers to rails, and also may be performed during ordinary use of a display system as a user rotates a display device between positions. The method 1000 includes, at 1002, rotating a display through a first portion of a rotational adjustment path. While traveling the first portion of the rotational adjustment path, at 1004, the follower for the cam rail segment moves out of a first detent in the cam rail segment and along a first portion of the cam rail segment, thereby compressing a spring that biases follower against the cam rail segment. The spring helps to maintain contact between the rollers and rail segments of the rotational mounting system during rotation, and thereby may help to avoid any perception of looseness at any stage of rotation. The force that causes the rotation may be applied manually by a user, as indicated at 1006, and/or may be provided or assisted by a motor or other mechanical force generator in some examples.

The method 1000 further includes, at 1008, rotating the display through a second portion of the rotational adjustment path. While traveling the second portion of the rotational adjustment path, at 1010, the follower for the cam rail segment moves along a second portion of the cam rail segment and into a second detent in the cam rail segment, thereby relaxing the spring such that the spring holds the display in a position corresponding to the second detent. The cam rail segment may be configured such that movement of the follower along the second portion of the cam rail segment occurs due to the relaxation of the spring, and thus appears to a user to be assisted or even occur automatically. The method 1000 further includes, at 1014, rotating the display back by, at 1016, moving the follower out of the second detent and in an opposite direction along the rotational adjustment path, thereby moving the follower back into the first detent. In some examples, the follower may move through multiple detents along both rotational directions, depending upon the particular profile of the cam rail segment.

Another example provides a system, comprising a display device, a support structure configured to be mounted to another structure to thereby support the display device, and a mechanical interface rotationally connecting the display device and the support structure, the mechanical interface comprising three or more rail segments including a cam rail segment comprising a cam, and for each rail segment, one or more corresponding rollers, a roller for the cam rail segment being a follower and being coupled with a spring configured to bias the follower toward the cam rail segment. One or more of the rail segments may additionally or alternatively be arranged on a support structure side of the mechanical interface. One or more of the rail segments may additionally or alternatively be arranged on a display side of the mechanical interface. Each of one or more rollers may additionally or alternatively be positioned interior to the corresponding rail segment along a radial direction relative to an axis of rotation of the mechanical interface. Each of one or more rollers may additionally or alternatively be positioned exterior to the corresponding rail segment along a radial direction relative to an axis of rotation of the mechanical interface. The cam rail segment may additionally or alternatively include one or more detents. The follower may additionally or alternatively be connected to a lever. The spring may additionally or alternatively include a mechanical spring. The spring may additionally or alternatively include an elastomeric material integrated with the follower.

Another example provides a rotational mounting system for a display device, the rotational mounting system comprising a display mount configured to be mounted to the display device, a support structure configured to be mounted to another structure, and a mechanical interface rotationally connecting the mount and the support structure, the mechanical interface comprising three or more rail segments including a cam rail segment comprising a cam, and for each rail segment, one or more corresponding rollers, a roller for the cam rail segment being a follower and being coupled with a spring configured to bias the follower toward the cam rail segment. Each of one or more rollers may additionally or alternatively be positioned interior to the corresponding rail segment for the roller along a radial direction relative to an axis of rotation of the mechanical interface. Each of one or more rollers may additionally or alternatively be positioned exterior to the corresponding rail segment for the roller along a radial direction relative to an axis of rotation of the mechanical interface. The cam rail segment may additionally or alternatively include one or more detents. The follower may additionally or alternatively be connected to a lever. The spring may additionally or alternatively include a mechanical spring coupled to the roller and configured to bias the roller to maintain contact with the cam rail segment. The spring may additionally or alternatively include an elastomeric material integrated with a rotational portion of the follower.

Another example provides a method of operating a rotationally-mounted display system, the rotationally-mounted display system comprising a display device and a support structure connected to the display device via a mechanical interface, the mechanical interface comprising three or more rail segments including a cam rail segment comprising a cam, and for each rail segment, one or more corresponding rollers, a roller for the cam rail segment being a follower and being coupled with a spring configured to bias the follower toward the cam rail segment. The method may include rotating the display device a first portion of a rotational adjustment by moving the follower for the cam rail segment out of a first detent in the cam rail segment and along a first portion of the cam rail segment, thereby compressing the spring, and rotating the display device a second portion of the rotational adjustment by moving the follower for the cam rail segment along a second portion of the cam rail segment and into a second detent in the cam rail segment, thereby relaxing the spring, such that the spring holds the display in a position corresponding to the second detent. Moving the follower for the cam rail segment out of the first detent and along the first portion of the cam rail segment may additionally or alternatively include applying manual force. Movement of the follower for the cam rail segment into the second detent may additionally or alternatively occur automatically via spring force. The method may additionally or alternatively include rotating the display device in an opposite direction by moving the follower for the cam rail segment out of the second detent and along the cam rail segment into the first detent.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system, comprising:
a display device;
a support structure configured to be mounted to another structure to thereby support the display device; and
a mechanical interface rotationally connecting the display device and the support structure, the mechanical interface comprising three or more rail segments including a cam rail segment comprising a cam, wherein the cam rail segment comprises at least a first detent and a second detent, and for each rail segment, one or more corresponding rollers, a roller for the cam rail segment being a follower that contacts the cam rail segment, wherein the follower is configured to move relative to the cam rail segment, the follower being coupled with a spring configured to bias the follower toward the cam rail segment, wherein a width of the cam rail segment varies along a length of the cam rail segment between the first detent and the second detent, such that movement of the follower along the cam rail segment between the first detent and the second detent varies a compression of the spring to provide varying resistance to rotation of the display device as a function of a location of the follower along the cam rail segment.

2. The system of claim 1, wherein one or more of the rail segments are arranged on a support structure side of the mechanical interface.

3. The system of claim 1, wherein one or more of the rail segments are arranged on a display side of the mechanical interface.

4. The system of claim 1, wherein each of one or more rollers is positioned interior to the corresponding rail segment along a radial direction relative to an axis of rotation of the mechanical interface.

5. The system of claim 1, wherein each of one or more rollers is positioned exterior to the corresponding rail segment along a radial direction relative to an axis of rotation of the mechanical interface.

6. The system of claim 1, wherein the follower is connected to a lever.

7. The system of claim 1, wherein the spring comprises a mechanical spring.

8. The system of claim 1, wherein the spring comprises an elastomeric material integrated with the follower.

9. A method of operating a rotationally-mounted display system, the rotationally-mounted display system comprising a display device and a support structure connected to the display device via a mechanical interface, the mechanical interface comprising three or more rail segments including a cam rail segment comprising a cam, wherein the cam rail segment comprises at least a first detent and a second detent, and for each rail segment, one or more corresponding rollers, a roller for the cam rail segment being a follower that contacts the cam rail segment, wherein the follower is configured to move relative to the cam rail segment, and the follower being coupled with a spring configured to bias the follower toward the cam rail segment, the method comprising:

rotating the display device a first portion of a rotational adjustment by moving the follower for the cam rail segment out of the first detent in the cam rail segment and along a first portion of the cam rail segment, thereby compressing the spring, wherein the spring provides resistance to rotation of the display device towards the first detent, wherein the resistance to the rotation provided by the spring varies as a function of a location of the follower along the cam rail segment based upon a width of the cam rail segment between the first detent and the second detent; and     rotating the display device a second portion of the rotational adjustment by moving the follower for the cam rail segment along a second portion of the cam rail segment and into the second detent in the cam rail segment, thereby relaxing the spring, such that the spring holds the display in a position corresponding to the second detent.

10. The method of claim 9, wherein moving the follower for the cam rail segment out of the first detent and along the first portion of the cam rail segment comprises applying manual force.

11. The method of claim 9, wherein movement of the follower for the cam rail segment into the second detent occurs automatically via spring force.

12. The method of claim 9, further comprising rotating the display device in an opposite direction by moving the follower for the cam rail segment out of the second detent and along the cam rail segment into the first detent.

13. A rotational mounting system for a display device, the rotational mounting system comprising:

a display mount configured to be mounted to the display device;

a support structure configured to be mounted to another structure; and     a mechanical interface rotationally connecting the mount and the support structure, the mechanical interface comprising         three or more rail segments including a cam rail segment comprising a cam, wherein the cam rail segment comprises at least a first detent and a second detent, and         for each rail segment, one or more corresponding rollers, a roller for the cam rail segment being a follower that contacts the cam rail segment, wherein the follower is configured to move relative to the cam rail segment, the follower being coupled with a spring configured to bias the follower toward the cam rail segment, wherein a width of the cam rail segment varies along a length of the cam rail segment between the first detent and the second detent, such that movement of the follower along the cam rail segment between the first detent and the second detent varies a compression of the spring to provide varying resistance to rotation of the display device as a function of a location of the follower along the cam rail segment.

14. The rotational mounting system of claim 13, wherein each of one or more rollers is positioned interior to the corresponding rail segment for the roller along a radial direction relative to an axis of rotation of the mechanical interface.

15. The rotational mounting system of claim 13, wherein each of one or more rollers is positioned exterior to the corresponding rail segment for the roller along a radial direction relative to an axis of rotation of the mechanical interface.

16. The rotational mounting system of claim 13, wherein the follower is connected to a lever.

17. The rotational mounting system of claim 13, wherein the spring comprises a mechanical spring coupled to the roller and configured to bias the roller to maintain contact with the cam rail segment.

18. The rotational mounting system of claim 13, wherein the spring comprises an elastomeric material integrated with a rotational portion of the follower.

19. The system of claim 1, wherein the follower sits in the first detent of the cam rail segment in a first display orientation, and wherein the follower sits in the second detent of the cam rail segment in a second display orientation.

20. The rotational mounting system of claim 13, wherein the follower sits in the first detent of the cam rail segment in a first display orientation, and wherein the follower sits in the second detent of the cam rail segment in a second display orientation.

\* \* \* \* \*